United States Patent [19]
Migler

[11] Patent Number: 4,685,424
[45] Date of Patent: Aug. 11, 1987

[54] POLE-"HOUSING" FOR MONKEYS

[76] Inventor: Bernard Migler, 1405 Autumn La., Cherry Hill, N.J. 08003

[21] Appl. No.: 896,286

[22] Filed: Aug. 14, 1986

[51] Int. Cl.⁴ .............................................. A01K 1/04
[52] U.S. Cl. ..................................... 119/120; 119/96
[58] Field of Search ................. 119/120, 96, 122, 15, 119/109, 17, 147, 118, 29

[56] References Cited

U.S. PATENT DOCUMENTS

| | | | |
|---|---|---|---|
| 223,672 | 1/1880 | Ashford | 119/122 |
| 727,376 | 5/1903 | Justus | 119/122 |
| 729,912 | 6/1903 | Andrews | 119/120 |
| 3,479,990 | 11/1969 | Crow | 119/29 |

Primary Examiner—John E. Murtagh
Assistant Examiner—Caroline D. Dennison

[57] ABSTRACT

A device for the long-term securing or "housing" of monkeys on poles is disclosed wherein a tether with rotatable joints is connected at one end to a collar around the monkey's neck and at the other end to a ring loosely fitted around a vertical climbing pole attached to a horizontal support means with perch means, and a source of food and water being supplied to each climbing pole, wherein the monkeys may climb up and down the climbing poles freely with the ring sliding up and down the pole, and wherein the monkey may make close social contact with other monkeys similarly restrained without their tethers becoming entangled.

16 Claims, 1 Drawing Figure

POLE-"HOUSING" FOR MONKEYS

FIELD OF THE INVENTION

This invention relates to an apparatus for the restraint or "housing" of monkeys on tethers attached to climbing poles.

BACKGROUND OF THE INVENTION

Research laboratories that use monkeys usually house them in relatively small cages with one or two monkeys per cage (cage housing) or in a large room or large cage with many monkeys present (gang housing). These two methods constitute the two principal methods that are now in use for housing of monkeys. Each method has its advantages and disadvantages. When monkeys are housed in individual cages they have little room to move about or climb and, if there is only one monkey in the cage, there is no opportunity for social contact. If two monkeys are kept in one cage there is social contact, but this is achieved at the expense of crowding. Cage housing has an advantage over gang housing in that the monkeys are easily caught for injections, examination, removal or other experimental procedures. Gang-housing on the other hand provides social contact and room to move about and climb. However the monkeys are not readily accessible to the experimenter; catching a monkey is difficult, requiring entrance into the gang cage and chasing the monkey with a net or trying to catch it while wearing gloves.

The present invention overcomes some of the deficiencies of cage and gang housing. The invention is comprised of a number of climbing poles to which the monkeys can be attached by tethers. One end (the first end) of the tether is attached to a collar around the monkey's neck; the other end of the tether (the second end) is attached to a loosely fitting ring that can slide up and down the pole as the monkey climbs up and down. Monkeys restrained on my device can climb up an down the poles, can make social contact with three to five adjacent monkeys, can obtain food and water at any time, and can be caught easily for injections, examinations, or other experimental procedures. The tethers are of such a length that the monkeys cannot become entangled with each others tethers.

SUMMARY OF THE INVENTION

This invention is a device for the "housing" of monkeys, comprising horizontal support means to which are secured a plurality of vertical climbing poles; a plurality of vertical support means attached to said horizontal support means; a plurality of vertical climbing poles fixedly attached to said horizontal support means; and a plurality of horizontal perches attached to said vertical support means, spaced so that the perches are not in close proximity to the vertical climbing poles; whereby a tether, slidably attached to each of said vertical climbing poles by a ring, having a collar at the other end of the tether, whereby an individual monkey that is restrained by the collar is permitted to climb up and down the climbing pole to which it is attached, and permitting a plurality of monkeys similarly attached to the device to make close social contact without their tethers becoming entangled.

This apparatus is useful for the more humane housing of monkeys than what is provided by conventional individual cages.

BRIEF DESCRIPTION OF THE DRAWINGS

For the purpose of illustrating the invention, there is shown in the accompanying drawing one form which is presently preferred; it being understood that the invention is not intended to be limited to the precise arrangements and instrumentalities shown.

DETAILED DESCRIPTION OF DRAWING

Figure 1:
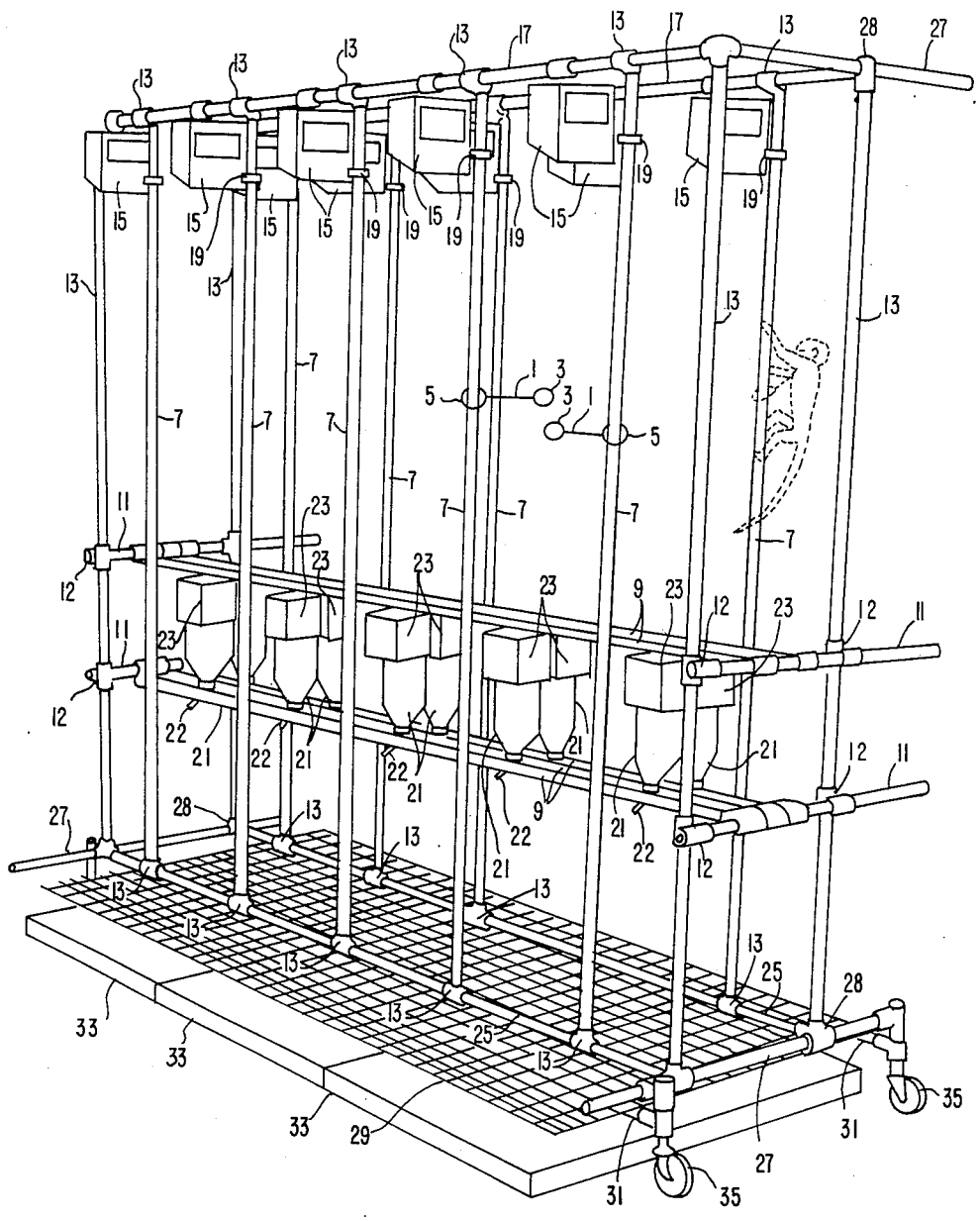
FIG. 1 is a perspective view of the invention.

Referring now to the drawing in detail there is shown in FIG. 1 a perspective view of a pole-housing device constructed in accordance with the principles of the present invention. A tether 1 (which may be a chain such as a link-chain or a bead chain, or a cable made of flexible metal such as steel or other material that is resistant to the chewing of the monkeys, and having one or more rotatable joints, and also having a spring clip, or sliding bolt clip or similar conventional means allowing quick disconnection of a collar, is attached at one end to a collar 3 around the neck of a monkey, and at the other end to a ring 5 that fits loosely around a vertical climbing pole 7. The monkey can climb up and down the climbing pole 7 with the ring 5 sliding freely up and down. The monkey can also rotate about the tether 1 freely due to the rotable joints of the tether 1 without the tether 1 becoming twisted. The collar 3 can be of any conventional collar material. The monkeys can sit on any one of a plurality of perches 9 secured to horizontal perch support members 11. The horizontal perch support members and the perches they support can be secured in place permanently by being welded or bolted to the vertical support members. However, in the preferred embodiment these horizontal perch support members 11 are secured by "T" fittings 12 (of the type sold by The Hollaender Mfg. Co., Cincinnati, Ohio) to vertical support members 13. The set screws of these fittings 12 can be loosened and the horizontal perch support members 11 and the perches 9 may be moved to a different height and resecured.

Food is available to the monkeys from food boxes 15 mounted on upper horizontal pole support members 11. The food boxes 15 may alternatively be mounted at the bottom or top of the climbing pole 7 or any other location that does not interfere with climbing. The food box 15 has a side opening through which the monkey can obtain food. The use of a side opening prevents urine or feces from droping onto the food. (In an alternative embodiment a long trough with side openings may be installed in place of one of the perches 9.) A large diameter collar 19 is mounted at the top of each climbing pole 7 and is held in place by a set screw. The screw may be loosened and the large diameter collar 19 lowered and secured at a lower position to restrict the extent of vertical movement allowed for a particular monkey.

Water is available for each monkey independently, from watering bottles 21. A conventional valve at the end of a drinking tube 22 allows water to flow when the drinking tube 22 is licked. The watering bottle 21 is secured in place at its lower end by inserting the drinking tube 22 through a hole in one of the perches 9, and is secured at its upper end by a housing 23. The housing 23 is a box that is open on the bottom and is secured to the underside of a perch. (To install the bottle the bottle is first inserted into the housing 23 then the drinking tube 22 is lowered through the hole. If necessary a bolt can be placed through the housing 23 above the bottle and secured in place with a nut or wing nut to prevent a monkey from lifting the bottle.) In an alternative embodiment water may be made available from drinking tubes spaced along the underside of one of the perches 9, which in this case would then be serving as both a perch and a pipe to carry water from a tank or other source of water.

A monkey may be tethered to each climbing pole 7. The length of each tether 1 is such that the collars 3 may partially overlap, permitting close social contact, such as grooming, huddling in a group, even sexual intercourse, without the monkeys becoming entangled in each other's tethers 1. Each climbing pole 7 may be secured in place permanently by being welded or bolted to the upper 17 and lower 25 horizontal pole support members. In the preferred embodiment each climbing pole 7 is secured in place by fittings 13 to the upper 17 and lower 25 horizontal perch support members. Set screws holding the fittings 12 may be loosened and the climbing poles 7 moved to one side or the other, then resecured. In this way the distance between climbing poles 7 may be adjusted. A new monkey may be housed at a greater than normal distance at one end of the line of climbing poles 7 and out of the reach of the adjacent monkeys then gradually brought closer to the group as it is slowly accepted. Also, a sick or injured monkey may be kept away from the others by this means. Climbing poles 7 may be removed or additional ones added as needed. The figure shows two lines of climbing poles 7. The distance between adjacent climbing poles 7 in each line of poles can be adjusted as described above. In addition, the distance between the lines of climbing poles may also be adjusted. The upper 17 and lower 25 horizontal perch support members and the vertical support members 13 are secured to upper and lower short horizontal support members 27 by fittings 28. Set screws in these fittings 28 may be loosened and the lines of poles moved closer or further apart, then resecured. The climbing poles 7 are secured at a distance from the perches 9, so that the ring 5 of the tether 1 may slide past the perch as the monkey climbs up and down.

A plurality of mesh gratings 29 are secured to horizontal grating support members 31 and permit urine and feces to drop through into a plurality of removable waste pans 33 and out of reach of the monkeys. The removeable waste pans rest on the floor. In an alternative embodiment the waste pans rest on horizontal waste pan support members attached to the lower short horizontal support members 27. (In another alternative embodiment the removeable waste pans 33 may be replaced wih a single long, inclined pan which empties into a drain hole at the lower end. This long pan may be flushed manually or automatically by conventional means.) The entire structure may be mounted on legs or, in the preferred embodiment, on locking casters 35 and may be rolled to and cleaned in a conventional cage washer.

The invention is an improvement over conventional housing of monkeys in individual cages because individual cages do not permit close social contact with other monkeys nor do they provide a means to exercise by climbing, to the extent provided by the invention. The invention also provides easier visual inspection of the monkeys than is possible when monkeys are housed in individual cages. Finally, the monkeys are more accessible to an experimenter than monkeys housed in cages, that is they can be caught more easily.

In another embodiment the vertical climbing poles 7 may be curved, straight or may contain angles, and may be positioned at any angle away from the perpendicular.

The number of vertical climbing poles used per each unit can vary greatly and can be 2 to 20 or much more, preferably the unit uses 6 to 12 vertical poles.

The present invention may be embodied in other specific forms without departing from the spirit or essential attributes thereof accordingly reference should by made to the appended claims rather than to the foregoing specification as indicating the scope of the invention.

It is obvious that the device can be constructed of various materials that are rigid and resistant to the chewing of the monkeys, for example iron or stainless steel pipe. The diameter of the climbing poles will depend upon the species of monkey, although approximately a one inch diameter will be sufficient for most monkeys.

I claim:

1. A device for the restraint or "housing" of monkeys comprising:
    (a) a bottom support member;
    (b) a plurality of vertical support members having first and second ends wherein the first ends are attached to the bottom support member;
    (c) a top horizontal support member attached to second ends of the vertical support member;
    (d) a plurality of vertical climbing poles having first and second ends attached at said first ends to the bottom support member and the second ends attached to the top horizontal support member;
    (e) a plurality of horizontal perches attached to said vertical support members, spaced so that the perches are not in close proximity to the vertical climbing poles;
    whereby one end of a tether can be attached to a ring which is slidably attached to each of said vertical climbing poles and the other end of the tether is attached to a collar holding an individual monkey that is restrained by the collar and is free to climb up and down the climbing pole to which it is attached and permitting a plurality of monkeys similarly attached to make close social contact without their tethers becoming entangled.

2. The device of claim 1 having a source of food and water provided to each climbing pole.

3. The device of claim 2 having slidably adjustable stops fixedly attached to each climbing pole to limit the extent to which the monkey can climb up or down the climbing pole to which it is attached.

4. The device of claim 3 having wheels attached to the bottom support member to permit the device to be rolled.

5. The device of claim 4 having attached to the bottom support member a horizontal grating to prevent the monkeys from reaching food or waste that has dropped below the grating.

6. The device of claim 5 having waste pans below the grating.

7. The device of claim 6 having horizontally slidable adjustable vertical climbing poles fixedly attached to said horizontal support means, permitting the distance between the said vertical climbing poles to be adjusted.

8. The device of claim 7 having vertically slidable adjustable perches attached to said vertical support members.

9. A device for the restraint or "housing" of monkeys comprising:

(a) a bottom support member;
(b) a plurality of vertical support members having first and second ends wherein the first ends are attached to the bottom support member;
(c) a top horizontal support member attached to second ends of the vertical support member;
(d) a plurality of vertical climbing poles having first and second ends attached at said first ends to the bottom support member and the second ends attached to the top horizontal support member;
(e) a plurality of horizontal perches attached to said vertical support members, spaced so that the perches are not in close proximity to the vertical climbing poles; and
(f) a plurality of rings fixedly slidably attached to each of said vertical climbing poles whereby one end of a tether is attached and the other end of the tether is attached to a collar holding an individual monkey that is restrained by the collar and is free to climb up and down the climbing pole to which it is attached and permitting a plurality of monkeys similarly attached to make close social contact without their tethers becoming entangled.

10. The device of claim 9 having a source of food and water provided to each climbing pole.

11. The device of claim 10 having slidably adjustable stops fixedly attached to each climbing pole to limit the extent to which the monkey can climb up or down the climbing pole to which it is attached.

12. The device of claim 11 having wheels attached to the bottom support member to permit the device to be rolled.

13. The device of claim 12 having attached to the bottom support member a horizontal grating to prevent the monkeys from reaching food or waste that has dropped below the grating.

14. The device of claim 13 having waste pans below the grating.

15. The device of claim 14 having horizontally slidable adjustable vertical climbing poles fixedly attached to said horizontal support means, permitting the distance between the said vertical climbing poles to be adjusted.

16. The device of claim 15 having vertically slidable adjustable perches attached to said vertical support members.

* * * * *